(12) United States Patent
Nair

(10) Patent No.: US 12,177,314 B2
(45) Date of Patent: Dec. 24, 2024

(54) CONTENT LINKING AND AGGREGATION

(71) Applicant: PayPal, Inc., San Jose, CA (US)

(72) Inventor: Rahul Rajavikraman Nair, Leander, TX (US)

(73) Assignee: PayPal, Inc., San Jose, CA (US)

( * ) Notice: Subject to any disclaimer, the term of this patent is extended or adjusted under 35 U.S.C. 154(b) by 477 days.

(21) Appl. No.: 15/955,039

(22) Filed: Apr. 17, 2018

(65) Prior Publication Data

US 2019/0320037 A1    Oct. 17, 2019

(51) Int. Cl.
*H04L 67/567*   (2022.01)
*H04L 51/52*    (2022.01)
*H04L 67/561*   (2022.01)

(52) U.S. Cl.
CPC .......... *H04L 67/567* (2022.05); *H04L 51/52* (2022.05); *H04L 67/561* (2022.05)

(58) Field of Classification Search
CPC .. H04L 51/32; H04L 67/2804; H04L 67/2838
See application file for complete search history.

(56) References Cited

U.S. PATENT DOCUMENTS

| | | | |
|---|---|---|---|
| 9,325,653 B1* | 4/2016 | Peterson | H04L 12/1813 |
| 10,353,907 B1* | 7/2019 | Gupta | G06F 16/248 |
| 10,360,642 B2* | 7/2019 | Greene | H04L 51/32 |
| 10,366,204 B2* | 7/2019 | Tanner, Jr. | G06Q 40/08 |
| 11,139,081 B2* | 10/2021 | Tran | G06Q 30/0206 |
| 11,153,097 B1* | 10/2021 | Griffin | H04L 9/3263 |
| 2011/0280228 A1* | 11/2011 | McCann | H04W 48/14 370/338 |
| 2014/0181694 A1* | 6/2014 | Barman | G06Q 50/01 715/753 |
| 2015/0245084 A1 | 8/2015 | Downing et al. | |
| 2016/0027074 A1* | 1/2016 | Poreh | G06Q 30/0201 705/7.35 |
| 2016/0321676 A1 | 11/2016 | McCoy et al. | |

(Continued)

FOREIGN PATENT DOCUMENTS

| CN | 107395353 A | 11/2017 |
|---|---|---|
| WO | WO 2017/194815 A1 | 11/2017 |

OTHER PUBLICATIONS

Tapscott et al., "Here's Why Blockchains Will Chang the World", May 8, 2016, https://fortune.com/2016/05/08/why-blockchains-will-change-the-world/ . (Year: 2016).*

(Continued)

*Primary Examiner* — Douglas B Blair
(74) *Attorney, Agent, or Firm* — Haynes and Boone, LLP

(57) ABSTRACT

Systems and methods for using a blockchain to share secondary content across multiple platforms are provided. A first platform receives content, such as an image or video. A content identifier is generated for the content. The first platform also receives secondary content, such as comments and reactions for the content. The content identifier is used to select a blockchain that stores the secondary content received by the first platform. When the content is shared with the second platform, the content identifier is shared with the content. The second platform uses the content identifier to retrieve secondary content associated with the content from the blockchain.

26 Claims, 8 Drawing Sheets

(56) References Cited

U.S. PATENT DOCUMENTS

| | | | |
|---|---|---|---|
| 2016/0359957 A1* | 12/2016 | Laliberte | H04L 51/32 |
| 2017/0041436 A1* | 2/2017 | Lopez, Jr. | H04L 67/1097 |
| 2017/0075941 A1* | 3/2017 | Finlow-Bates | H04L 67/104 |
| 2017/0091397 A1 | 3/2017 | Shah | |
| 2017/0103472 A1 | 4/2017 | Shah | |
| 2017/0295157 A1* | 10/2017 | Chavez | G06F 21/6218 |
| 2017/0300976 A1* | 10/2017 | Dogruoz | G06Q 30/0241 |
| 2018/0189910 A1* | 7/2018 | Deninno | G06Q 50/01 |
| 2018/0204201 A1* | 7/2018 | Cheek | G06Q 20/405 |
| 2018/0204213 A1* | 7/2018 | Zappier | H04L 63/08 |
| 2019/0018867 A1* | 1/2019 | Li | G06F 16/951 |
| 2019/0130033 A1* | 5/2019 | Baumgardner | G06Q 10/1091 |
| 2019/0163700 A1* | 5/2019 | Baumgardner | G06F 16/4387 |
| 2019/0180276 A1* | 6/2019 | Lee | H04L 9/3247 |
| 2019/0207995 A1* | 7/2019 | Gonzales, Jr. | G06Q 20/3825 |
| 2019/0229920 A1* | 7/2019 | Naqvi | H04L 9/3239 |
| 2019/0295078 A1* | 9/2019 | Bae | G06F 16/1824 |
| 2019/0318117 A1* | 10/2019 | Beecham | H04L 9/3239 |
| 2021/0042349 A1* | 2/2021 | Desmond | G06F 16/901 |
| 2021/0366038 A1* | 11/2021 | Baumgardner | G06Q 10/20 |
| 2022/0005053 A1* | 1/2022 | Gurugubelli | G06Q 30/0631 |
| 2023/0092134 A1* | 3/2023 | Joao | H04L 65/403 |

OTHER PUBLICATIONS

Nakamoto, "Bitcoin: A Peer-to-Peer Electronic Cash System", 2008, bitcoin.org/bitcoin.pdf . (Year: 2008).*

Mazonka, "Blockchain: Simple Explanation", Dec. 29, 2016, http://jrxv.net/x/16/chain.pdf . (Year: 2016).*

Crosby et al., "BlockChain Technology", Oct. 16, 2015, http://scet.berkeley.edu/wp-content/uploads/BlockchainPaper.pdf . (Year : 2015).*

Search Report and Written Opinion from Singapore Application No. 11202006895Y, dated Aug. 13, 2021, 8 pages.

\* cited by examiner

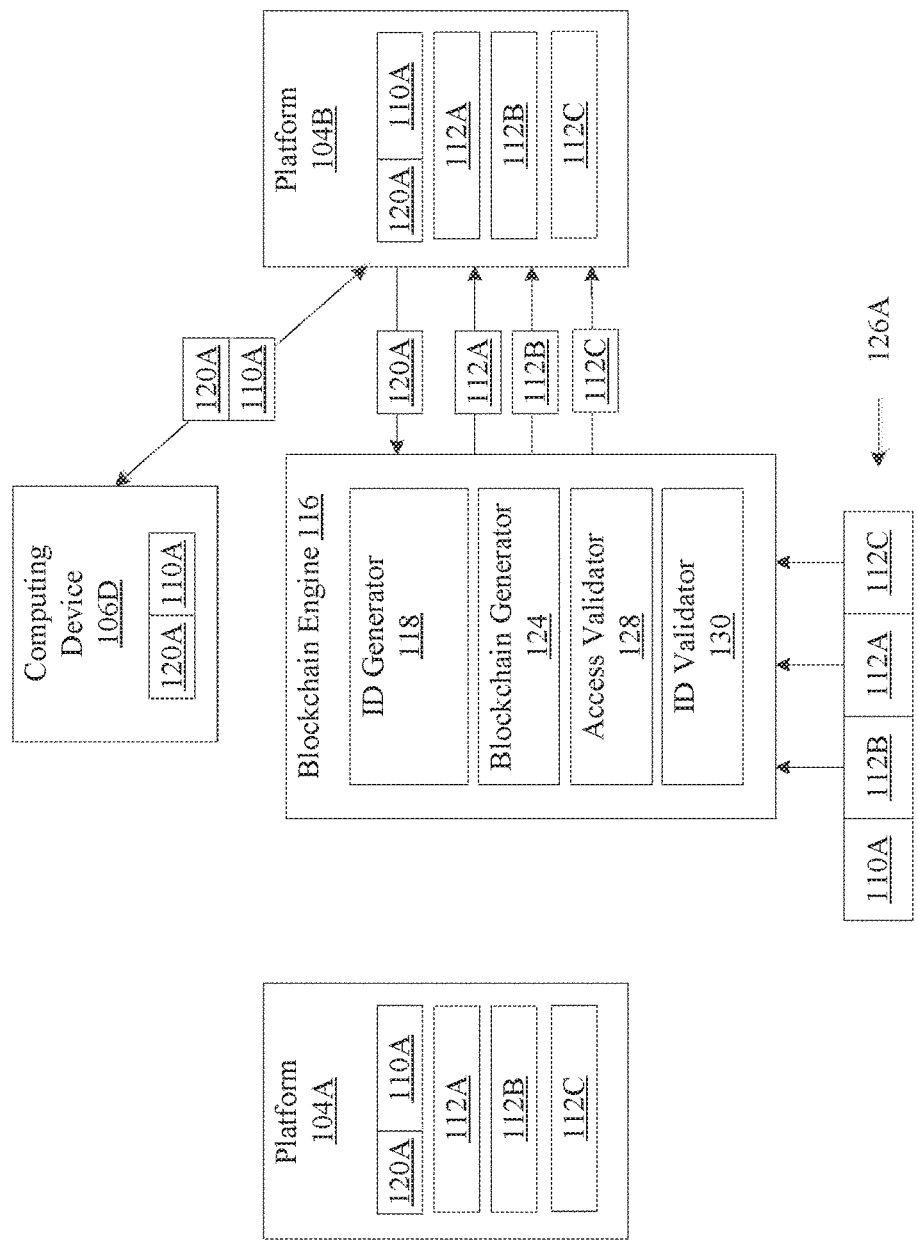

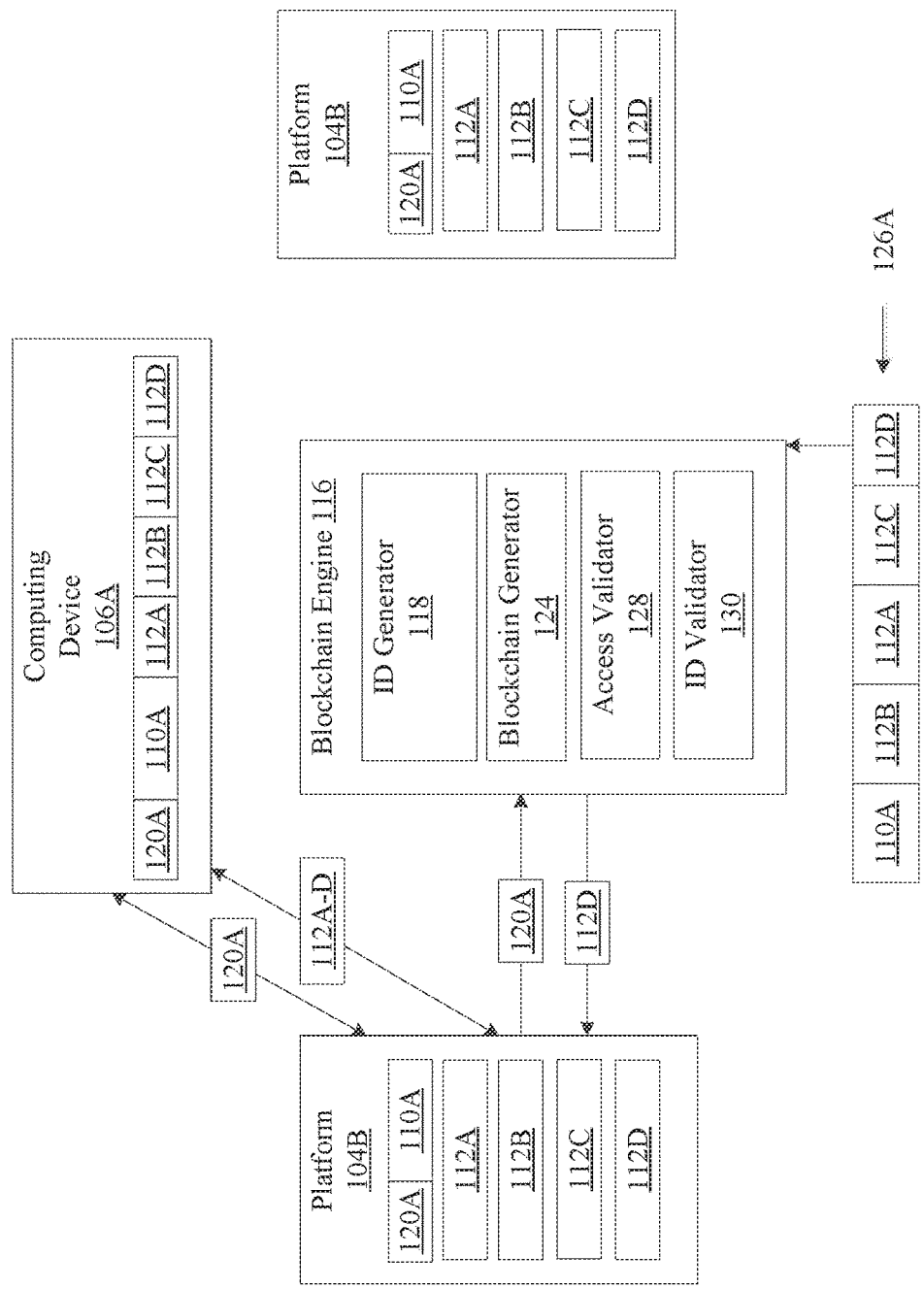

CONTENT LINKING AND AGGREGATION

TECHNICAL FIELD

The disclosure generally relates to blockchain, and more specifically to using a blockchain to share secondary data of electronic content with multiple online platforms.

BACKGROUND

Electronic content may be shared with and displayed on multiple online platforms. The electronic content displayed on a platform may also have or contain secondary data or content. The secondary content may be views, posts, comments, etc. that are made regarding or associated with the content. In conventional systems, however, the secondary content is localized to a platform that receives the secondary content.

Because the secondary content is localized to a platform that receives the secondary content, the secondary content is not shared across platforms. This means that the users viewing the content on different online platforms cannot access the secondary content from these other platforms.

BRIEF DESCRIPTION OF THE DRAWINGS

FIGS. 2A-2D are block diagrams that illustrate a system that shares secondary content across different platforms, according to an embodiment.

Figure 1:
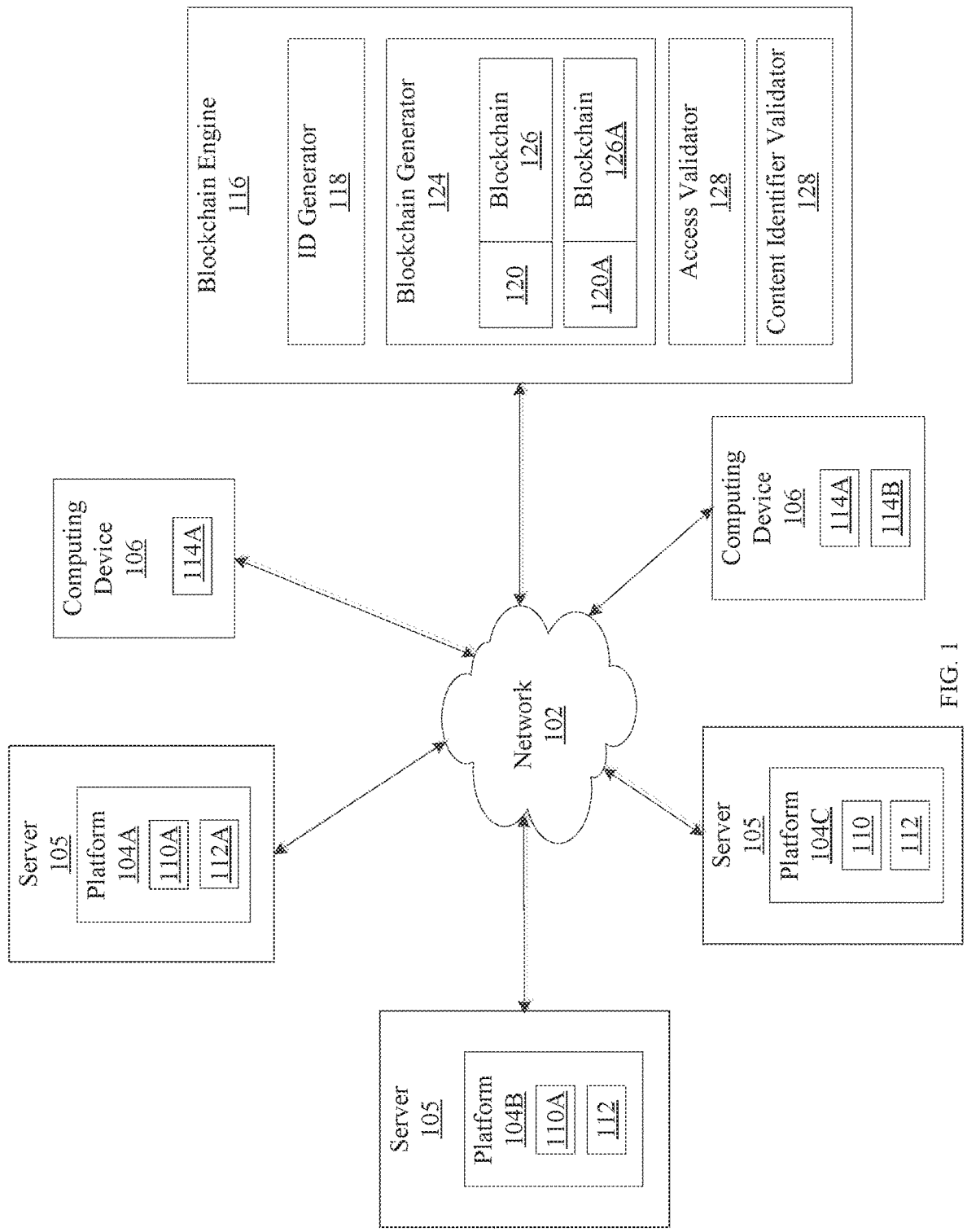
FIG. 1 is an exemplary system where content sharing with a blockchain can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Online platforms receive, store, and manipulate content, such as social media content, on a blockchain. Because the content is stored on a blockchain, other social media platforms may access the blockchain and obtain the media content from another platform and offer users aggregated media content from multiple platforms. Further, because a social media platform may display aggregated content from multiple platforms, the social media platform may display the aggregated media content in a way that is specific to the platform. For example, one social media platform may present the content top down with the latest content being presented on top, while another social media platform may present the content based on the content categories, such as 'likes', comments, theme etc., yet another social media platform may present the content using its own layout schemes.

Additionally, because the aggregated media content from multiple social media platforms may be displayed on a particular social media platform, a user does not need to access multiple social media platforms to receive the media content. Instead, the user may access a single social media platform and obtain content posted by users on different platforms.

The embodiments below describe how online platforms store and aggregate content and share content across multiple social media platforms, or simply platforms.

A computing device uploads content, such as an image, a video, an article, music, or other digital data to a first platform. Once the content is uploaded, the first platform may receive secondary content that comments, critiques, rates, etc. the uploaded content.

In order to share the content and the secondary content across multiple online platforms, the first platform requests a content identifier for the content from a content generator. The content identifier may be transmitted with the content to different platforms. Additionally, the content identifier may also be used to access a blockchain. The blockchain may store content and secondary content for the content from multiple platforms.

In an embodiment, the first platform may use the content identifier to store the secondary content associated with the content on the blockchain. This may occur in real-time or at predetermined intervals.

The content on the first platform may be shared. For example, a computing device may download the content from the first platform to the computing device and then upload the content onto the second platform. In another example, the second platform may receive the content and the content identifier over a network. In an embodiment, the computing device may also download and upload the content identifier with the content.

Once the second platform receives the content and the content identifier from the computing device or over a network, the second platform may use the content identifier to query the blockchain for the secondary content associated with the content. As discussed above, the first platform may have added the secondary content to the content. In response to the query, the second platform may receive the secondary content associated with the shared content from the blockchain.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network.

In an embodiment, one or more online or mobile platforms 104 may be connected to network 102. As illustrated in FIG. 1, platforms 104A-C may be connected to network 102. Platform 104 may include a set of services, tools, products, applications that may be assessed by users, computing devices, etc. Platform 104 may also store and display content. An example platform may be a social media platforms, such as a Facebook™ platform, Whatsup™ platform, Twitter™ platform, etc.

In an embodiment, platform 104 may be stored on and execute on a server 105. An example server 105 may be a computing device that includes hardware and software for large scale processing. In another example, server 105 may be a computer program installed on a computing device that provides services to platform 104 and also allows computing devices 106 to access platform 104 to post and retrieve content, use available services, etc. In an embodiment, server 105 may be maintained by a service provider, such as PAYPAL®, a social networking service, and/or other service providers.

In an embodiment, one or more computing devices 106 may be connected to network 102. Computing devices 106 may be portable and non-portable electronic devices under control of a user and configured to transmit, receive, manipulate, post, etc., data and content to and from platforms 104. Example computing devices 106 include desktop computers, laptop computers, tablets, smartphones, wearable computing devices, eyeglasses that incorporate computing devices, implantable computing devices, etc.

In an embodiment, platform 104 may include content 110. Content 110 may be textual, visual, or aural content. Example content may be articles, books, news synopsis, images, videos, songs, books, etc. In some embodiments, platform 104 may receive content 110 from one or more computing devices 106.

In yet another embodiment, platform 104 may include secondary content 112. Secondary content 112 may be associated with, describe, or be a reaction to content 110. For example, if content 110 is an image, content 112 may include posts, comments, user reactions such as "likes" and "dislikes", etc., to the image. Secondary content 112 may also include platform notifications, e-mail messages, peer to peer messages, and other messages or content in the messages that are communicated between computing device 106 and platform 104. In some embodiments, platform 104 may receive secondary content 112 from one or more computing devices 106 that may be the same or different from the computing device 106 that uploaded content 110.

In an embodiment, computing device 106 may include one or more applications 114. Application 114 may include a client side counterpart to a corresponding platform 104 or an application counterpart that is included in platform 104. Application 114 may be used to download, or otherwise obtain content 110 and secondary content 112 from platform 104 and also post content 110 and/or secondary content 112 to platform 104. In an embodiment, application 114 may be associated with a corresponding platform 104. For example, application 114A may be associated with platform 104A, and application 114B may be associated with platform 104B.

In an embodiment, application 114 may be a browser. In this case, platform 104A may display content 110 and secondary content 112 in a webpage that is downloaded onto application 114 from platform 104. In another embodiment, application 114 may be an application that is downloaded or installed onto computing device 106 from server 105 that hosts platform 104, through a third party application store or from a memory device such a compact disk, a thumb drive, or an external hard drive.

In an embodiment, content 110 may be shared or moved across multiple platforms 104. For example, content 110A on platform 104A may be shared via a link, an email, etc., with platform 104B. In another example, content 110A from platform 104A may be downloaded onto computing device 106 and then uploaded from computing device 106 to platform 104B. In conventional systems, when the content included in the first platform is shared with the second platform, the secondary content associated when the content is not shared from the first platform to the second platform. Instead, the second platform may include the secondary content uploaded from computing device 106 and is different from the secondary content included on the first platform.

To share secondary content among multiple platforms 104, system 100 includes a blockchain engine 116. Blockchain engine 116 may enable secondary content 112 to be shared across multiple platforms 104 together with content 110. In an embodiment, blockchain engine 116 may include an ID generator 118. ID generator 118 may generate a content identifier 120 and associate content identifier 120 with content 110. An example content identifier may be a binary, a numeric or alphanumeric identifier, etc. Further, when content 110 is shared from platform 104A to platform 104B or another platform 104, content identifier 120 may be shared with content 110.

In an embodiment, blockchain engine 116 may include a blockchain generator 124. Blockchain generator 124 may generate a blockchain 126. Blockchain 126 may be a continuously growing list or records or blocks which are linked and secured using cryptography. In an embodiment, blockchain 126 may be associated with content 110.

In one embodiment, each block in blockchain 126 may contain a cryptographic hash of the previous block, a timestamp and a portion of secondary content 112 for content 110. For example, each block in blockchain 126 may include a post, a comment, etc., associated with content 110 that was posted on one of platforms 104. Further, a timestamp may indicate the time that the block was created, the time that the post, comment, etc., was posted to platform 104, etc.

In an embodiment, blockchain engine 116 may also associate content identifier 120 with blockchain 126. For example, content identifier 120A associated with content 110A may be associated with blockchain 126A that stores secondary content 112A. In this way, blockchain engine 116 or platform 104 may use content identifier 120 to access blockchain 126 and store or retrieve secondary content 112 to and from blockchain 126.

As illustrated in FIG. 1, blockchain 126 is included in blockchain engine 116. The implementation, however, is not limited to this embodiment, as blockchain 126 may be stored in a distributed database where portions of blockchain 126 may be distributed over servers 105 and computing devices 106 that are connected over network 102.

As discussed above, blockchain 126 may store secondary content 112 for content 110 that has been uploaded to multiple platforms 104. Because blockchain 126 stores secondary content 112 from multiple platforms 104, each platform 104 may access blockchain 126 and retrieve secondary content that was posted by other platforms 104. In this way, secondary content 112 for content 110 may be shared across platforms 104.

FIGS. 2A-2D are block diagrams 200A-D of a system that illustrates how secondary content is shared across platforms, according to an embodiment.

Figure 2A:
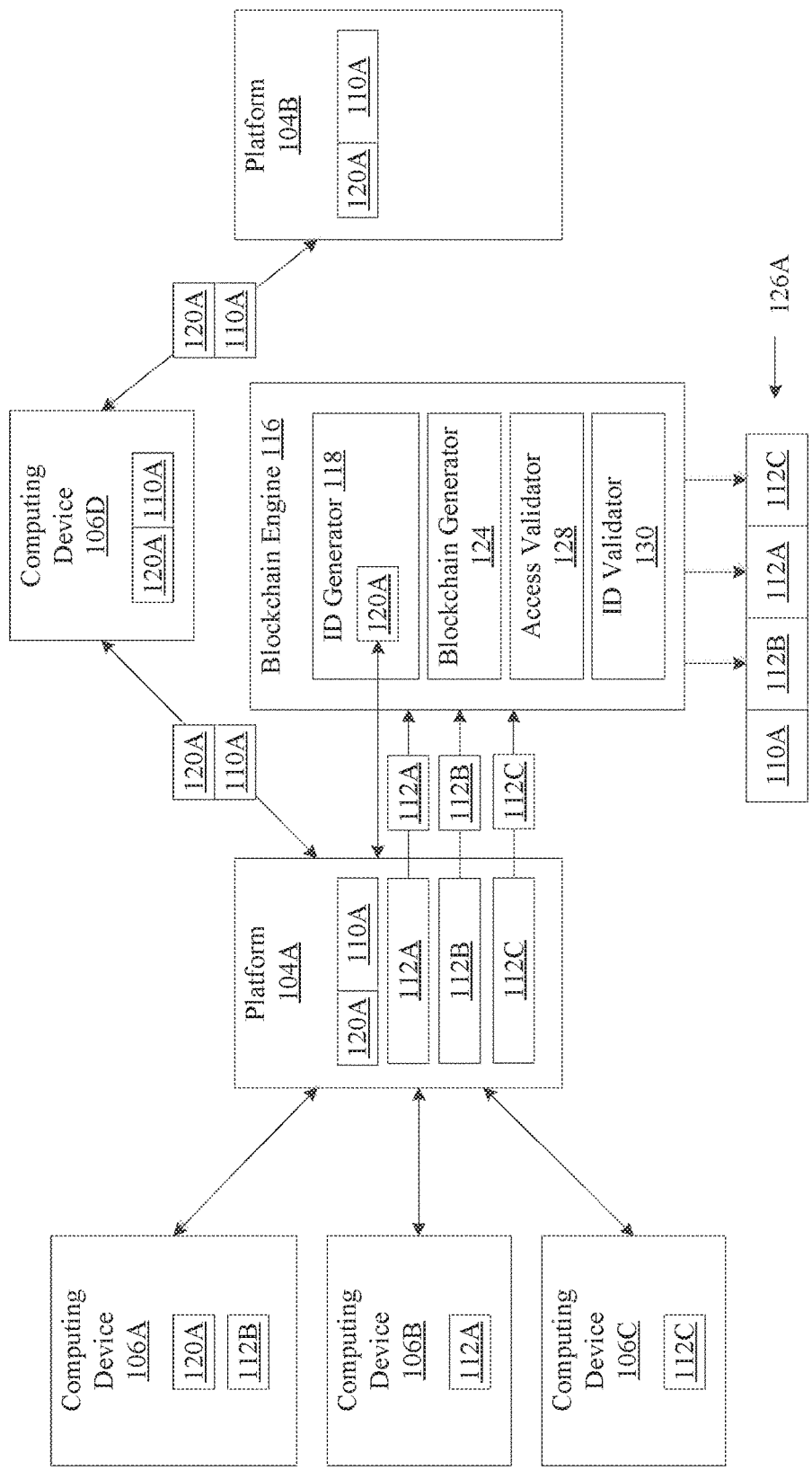

As illustrated in FIG. 2A, platform 104A includes content 110A. In one embodiment, computing device 106A may have uploaded content 110A to platform 104A. In another embodiment, platform 104A may have received content 110A from elsewhere over network 102, etc.

In an embodiment, when platform 104A receives content 110A that is not associated with a content identifier 120, platform 104A may request content identifier 120 for content 110A from ID generator 118. In some embodiments, platform 104A may use an application programing interface (API) to make a request for content identifier 120 to ID generator 118. An API may be an interface that may be software, a library, etc., that may be installed or downloaded onto platform 104A or another platform 104. Further platform 104 may use an API to request and receive content from blockchain engine 116. In response to the request to receive content identifier for content 110A, ID generator 118 may generate content identifier 120A and associate content identifier 120A with content 110A. Further ID generator 118 may associate content identifier 120A with blockchain 126A. Once associated, content identifier 120A may be used to store secondary content 112A on blockchain 126A and retrieve secondary content 112A from blockchain 126A.

Although FIG. 2A illustrates a single content 110A that is associated with content identifier 120A, there may be multiple instances of content 110 for which ID generator 118 may generate a corresponding content identifier 120.

As illustrated in FIG. 2A, computing devices 106A-C may post, upload, etc., secondary content 112 for content 110A to platform 104A. For example, computing device 106A may post secondary content 112B to platform 104A, computing device 106B may post secondary content 112A to platform 104A, and/or computing device 106C may post secondary content 112C to platform 104A.

In an embodiment, platform 104A may store secondary content 112A-C to blockchain 126A. This may occur in real-time when each of secondary content 112A-C may have been posted to platform 104A or at preconfigured time intervals. To post secondary content 112A-C to blockchain 126A, platform 104A may transmit content identifier 120A, secondary content 112B, secondary content 112A, and secondary content 112C to blockchain engine 116. Blockchain engine 116 may use content identifier 120A to identify blockchain 126A and store secondary content 112B, secondary content 112A, and secondary content 112C to blockchain 126A. In some embodiments, blockchain engine 116 may store secondary content 112B, secondary content 112A, and secondary content 112C to blockchain 126A in a chronological order that secondary content 112B, secondary content 112A, and secondary content 112C may have been posted to platform 104, in random order, etc. In an embodiment, a first block in blockchain 126A may be created for secondary content 112B, a second block for secondary content 112A, and a third block may be created for secondary content 112C.

In an embodiment, blockchain engine 116 may also include an access validator 128. Access validator 128 may validate whether secondary content 112A-C may be stored on blockchain 126. This is because some users may not want the secondary content 112A-C to be stored on blockchain 126A and be available to other platforms 104. Accordingly, access validator 128 may send a message to platform 104A that a user may use computing device 106 to acknowledge that secondary content 112A-C may or may not be stored on blockchain 126A.

In an embodiment, blockchain engine 116 may include an ID validator 130. ID validator 130 may scan blockchains 126 and identify duplicate content identifiers, if any. If duplicate content identifiers exist, ID validator 130 may identify content 110 and secondary content 112 that may be associated with the duplicate content identifiers and may cause ID generator 118 to assign a new content identifier 120 to content 110 and secondary content 112 associated with one of the duplicate content identifiers.

In an embodiment, platform 104A may share content 110 with one or more computing devices 106 or with another platform 104. As illustrated in FIG. 2A, platform 104A may distribute content 110A to computing device 106D or computing device 106D may request content 110A from platform 104A. Unlike conventional systems, when platform 104A shares content 110A, platform 104A also shares content identifier 120A with content 110A.

In an embodiment, computing device 106D may share or distribute content 110A to a different platform 104, such as platform 104B. Platform 104B may be a different platform from 104A, be a different instance of platform 104A, etc.

Unlike conventional systems that do not share secondary content from platform to platform, secondary content 112A-C associated with content 110A on platform 104A may also be shared with platform 104B via blockchain 126A.

FIG. 2B is a block diagram 200B of a system that illustrates how secondary content 112A-C may be shared from platform 104A to platform 104B, according to an embodiment. As illustrated in FIG. 2B, computing device 106D may upload content 110A to platform 104B. Together with content 110A, computing device 106D may also upload content identifier 120A.

In an embodiment, platform 104 may use blockchain engine 116 to retrieve secondary content 112A-C from blockchain 126A. For example, platform 104B may transmit content identifier 120A to blockchain engine 116. Blockchain engine 116 may use content identifier 120A to retrieve secondary content 112A-C from blockchain 126A and transmit secondary content 112A-C to platform 104B. In another embodiment, platform 104B may use an API to access blockchain 126A directly.

In an embodiment, platform 104B may retrieve secondary content 112A-C when platform 104 receives content 110A with content identifier 120A. In another embodiment, once platform 104B receives content 110A with content identifier 120A, platform 104B may poll blockchain 126A for additional secondary content 112 at predefined time increments.

Figure 2C:
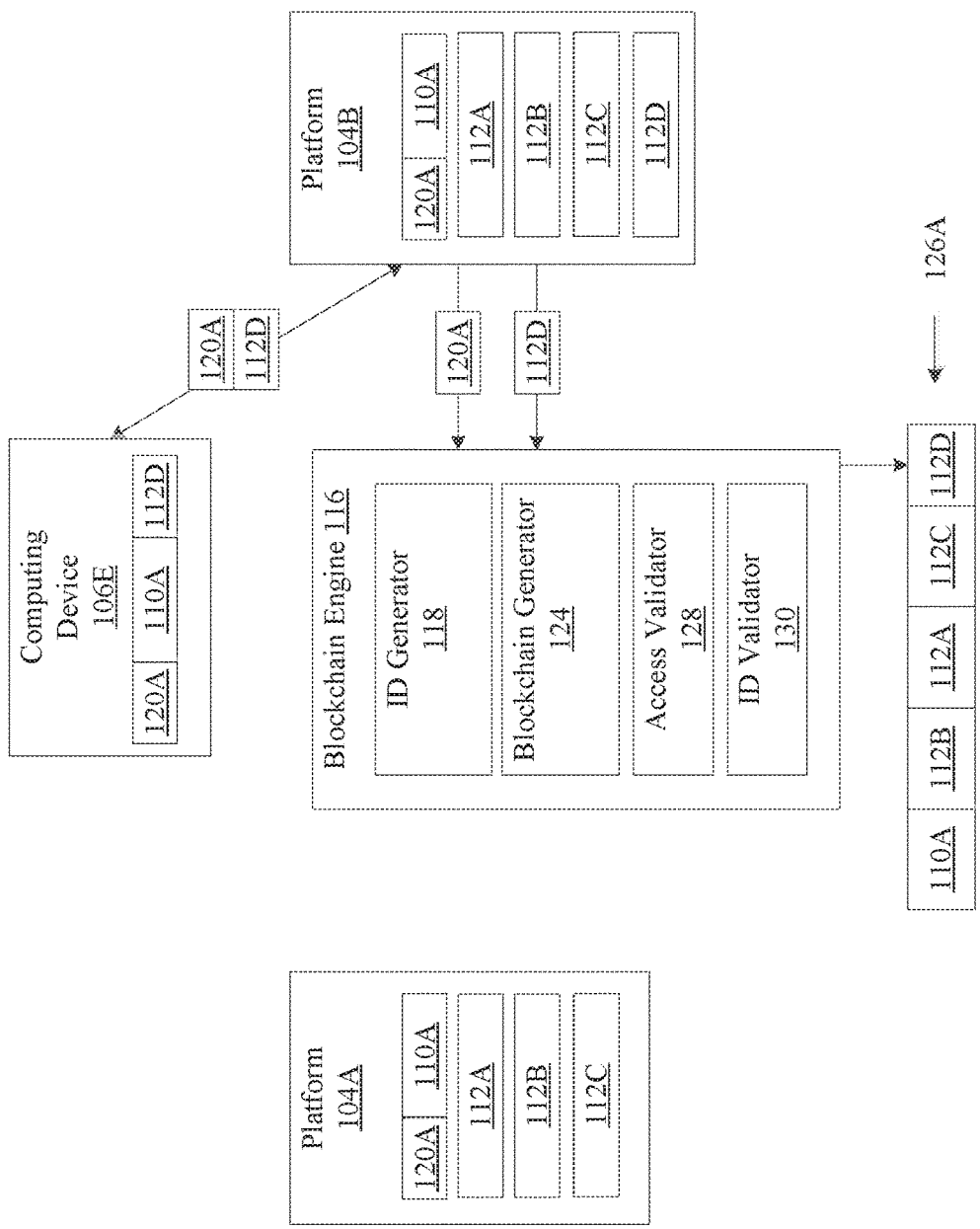

In an embodiment, platform 104B may also receive secondary content 112 and add secondary content 112 to blockchain 126. FIG. 2C is a block diagram 200C of a platform adding secondary content to a blockchain, according to an embodiment. As illustrated in FIG. 2C, computing device 106E may upload secondary content 112D that is associated with content 110A to platform 104B.

In an embodiment, platform 104B may also distribute secondary content 112D to other platforms 104. To distribute secondary content 112D to other platforms 104, platform 104B may add secondary content 112D to blockchain 126A. For example, platform 104B may transmit content identifier 120A together with secondary content 112D to blockchain engine 116 or directly to blockchain 126A. Blockchain engine 116 may use content identifier 120A to add secondary content 112D to blockchain 126A.

FIG. 2D is a block diagram 200D that illustrates how secondary content may be distributed to another platform, according to an embodiment. For example, platform 104A may request secondary content 112A for content 110A from blockchain 126A or blockchain 126A may synchronize secondary content 112D with platform 104A upon including a new block with secondary content 112 or at predefined time intervals. As illustrated in FIG. 2D, secondary content 112A-D associated with content 110A is stored in blockchain 126A.

In an embodiment, to synchronize or request secondary content 112 from blockchain 126A, platform 104A may issue a request to blockchain engine 116. The request may include content identifier 120A. In response to the request, blockchain engine 116 may use content identifier 120A to identify blockchain 126A and retrieve secondary content 112D included in blockchain 126A. Once retrieved, blockchain engine 116 may issue a response that includes secondary content 112D.

In an embodiment, platform 104A may receive secondary content 112D. Once received, platform 104A may upload secondary content 112A-D to computing device 106A.

In an embodiment, sharing secondary content 112 with different platforms 104 allows users to participate in cross platform communications in real-time. This is because each platform 104 may include secondary content 112 from multiple platforms 104 that have been aggregated on blockchain 126.

In yet another embodiment, because each platform 104, such as platform 104A may receive secondary content 112 that was initially retrieved by multiple platforms 104, platform 104A may organize and display secondary content 112 on computing devices 106 is a way specific to platform 104A. For example, platform 104A may display secondary content 112 in a top down manner with the newest secondary content 112 on top, while platform 104B, for example, may segregate content 112 into "likes", "dislikes", and comments. Further, platform 104A may display secondary content 112 in a layout specific to platform 104A, while platform 104B may display the same secondary content 112 in a way specific to platform 104B.

In an embodiment, storing secondary content 112 from multiple platforms 104 on blockchain 126 may also extend capabilities of different platforms 104. For example, suppose platform 104A has a marketplace and platform 104B does not. But because platform 104A and 104B share secondary content 112 using blockchain 126, secondary content 112 that includes a posting to sell an item posted on platform 104A may be viewed by computing device 106 that has access to platform 104B even though platform 104B does not have a marketplace. In another example, platform 104A may have payment processing capability, while platform 104B does not. However, because secondary content 112 may be shared between platforms 104A and 104B, the payment processing capability may be included in secondary content 112 and shared with platform 204B via blockchain 126.

In yet another example, a content 110A may be a merchandise listing. As discussed above, merchandise listing and content identifier 120A for the merchandise listing may be available to multiple platforms 104. In an embodiment, example secondary content 112A-C for a merchandise listing may be a price of the merchandise, preferred payment options, non-preferred payment options, etc. Further, each block in blockchain 126A for merchandise listing may include the merchandise listing that is mapped to a seller and/or platform 104A or platform 104B where merchandise is listed for sale. Suppose, in an embodiment, platform 104A that includes the merchandise listing does not include a payment processing system, while platform 104B includes a payment processing system. Accordingly, when platform 104B retrieves the merchandise listing and secondary content 112A-C from blockchain 126A, the payment processing system of platform 104B may process the sale of the merchandise. This is because, a user which posted the merchandise listing to platform 104A may also access platform 104B and cause the payment processing system of platform 104B to complete the sale of merchandise with another user using platform 104B.

Figure 3:
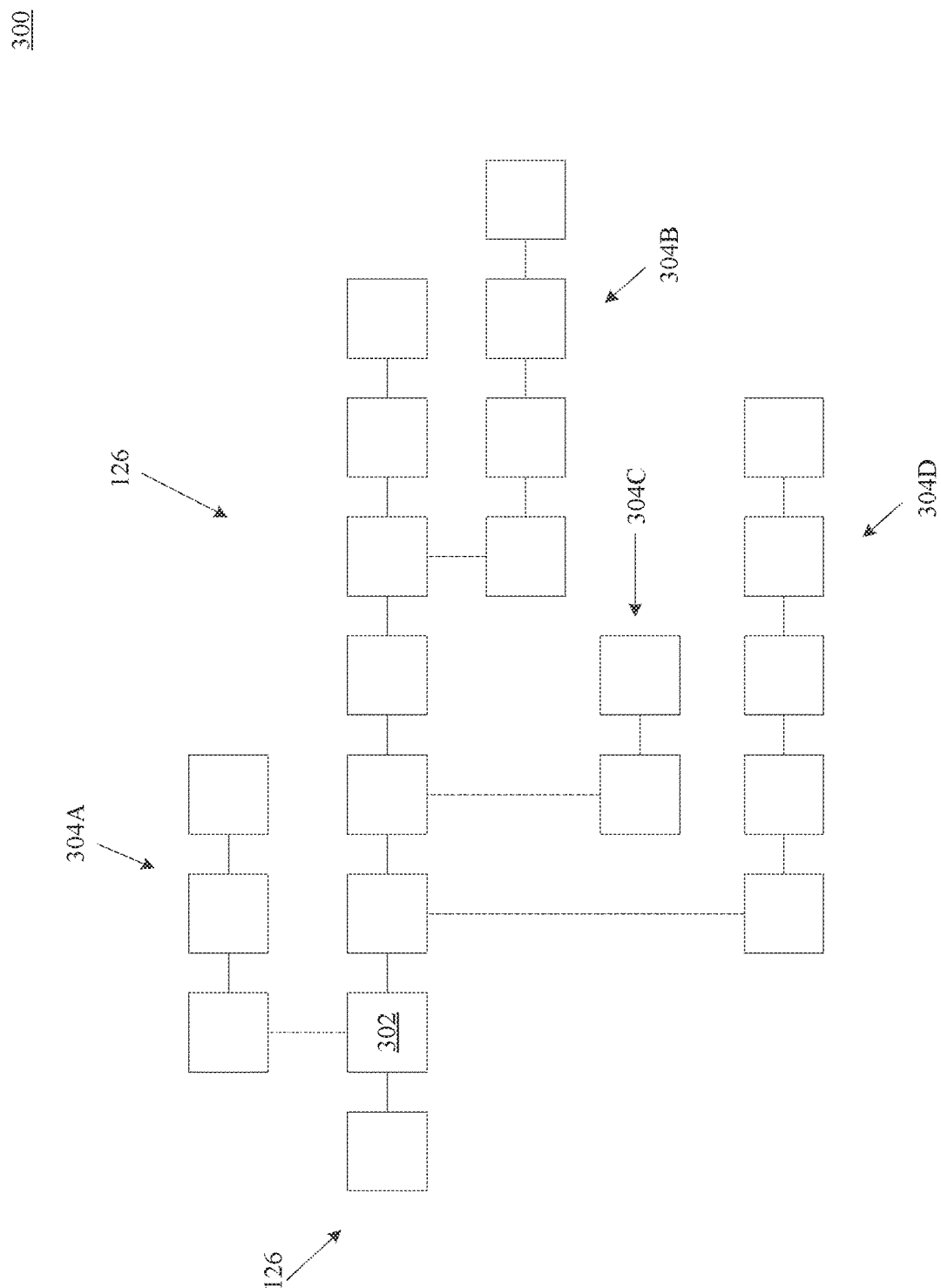
FIG. 3 is a blockchain that is associated with sidechains, according to an embodiment.

In an embodiment, blockchain 126 may include one or more sidechains. FIG. 3 is a block diagram 300 that illustrates a blockchain that is associated with sidechains, according to an embodiment. As illustrated in FIG. 3, blockchain 126 is associated with sidechains 304A, 304B, 304C and 304D in a non-limiting embodiment.

Sidechains 304A-D may be blockchains that are separate from blockchain 126 but are associated with or provide information regarding content 110 or secondary content 112 stored in each block of blockchain 126.

In an embodiment, each sidechain 304 may be associated with secondary content 112 stored in a particular block of main chain 302. For example, sidechain 304A may be associated with block 302 of blockchain 126. In another example, sidechains 304A-D may also be associated with blocks from different blockchains 126 (not shown).

In an embodiment, sidechains 304A-D may provide content to platforms 104 independently from blockchain 126. The content from sidechains 304A-D may be content based on content 110, secondary content 112, users generating secondary content 112, platform 104 specific content, etc.

In an embodiment, sidechains 304A-D may also store content 110 and secondary content 112 from multiple blockchains 126. In this way, if one of blockchains 126 is corrupted, then blockchain 126 may be reconstructed from one or more sidechains.

In an embodiment, sidechain 304A-D may segregate secondary content 112 included in one or more blockchains 126. For example, blockchain 126 may include different platforms 104 and each sidechain 304 may include comments from a particular platform 104 that stores comments on blockchain 126. In another example, blockchain 126 may store information associated with different users and each sidechain 304A, 304B and 304C may be associated with comments posted by a particular user. In another example, sidechains 304A-C may be modeled around user engagement with content 110. In this case, sidechain 304A may be associated with one user who used computing device 106 to manipulate content 110 on one or more platforms 104, while sidechain 304B may be associated with another user. Example user engagement may be computing device 106 receiving user input that indicates that content 110 is "liked", is being shared to another platform, is being commented on, etc. In yet another example, sidechain 304 may be modeled around a group of users. In this case, sidechain 304 may include secondary content 112 that may be generated by the users in the group.

In yet another example, sidechain 304 may include the nature of secondary content 112. In this case, secondary content 112 may indicate a "like" or "dislike" of content 110, and sidechain 304 may include the "likes" or "dislikes" posted by multiple users regardless of the platform that receives the "like" or "dislike".

In yet another example, sidechain 304 may include secondary content 112 that includes comments of multiple users irrespective of which platform 104 initially received the comment.

In yet another embodiment, sidechain 304 may include the "shares" of content 110 from one platform to another platform.

In yet another embodiment, sidechain 304 may include secondary content 112 that has been posted from the same computing device 106 on multiple platforms 104. In this case, sidechain 304 may include secondary content 112 that has been uploaded from the same Internet Protocol ("IP") address. In this way, sidechain 304 may include duplicate results that the same user has posted on multiple platforms 104 about content 110.

Figure 4:
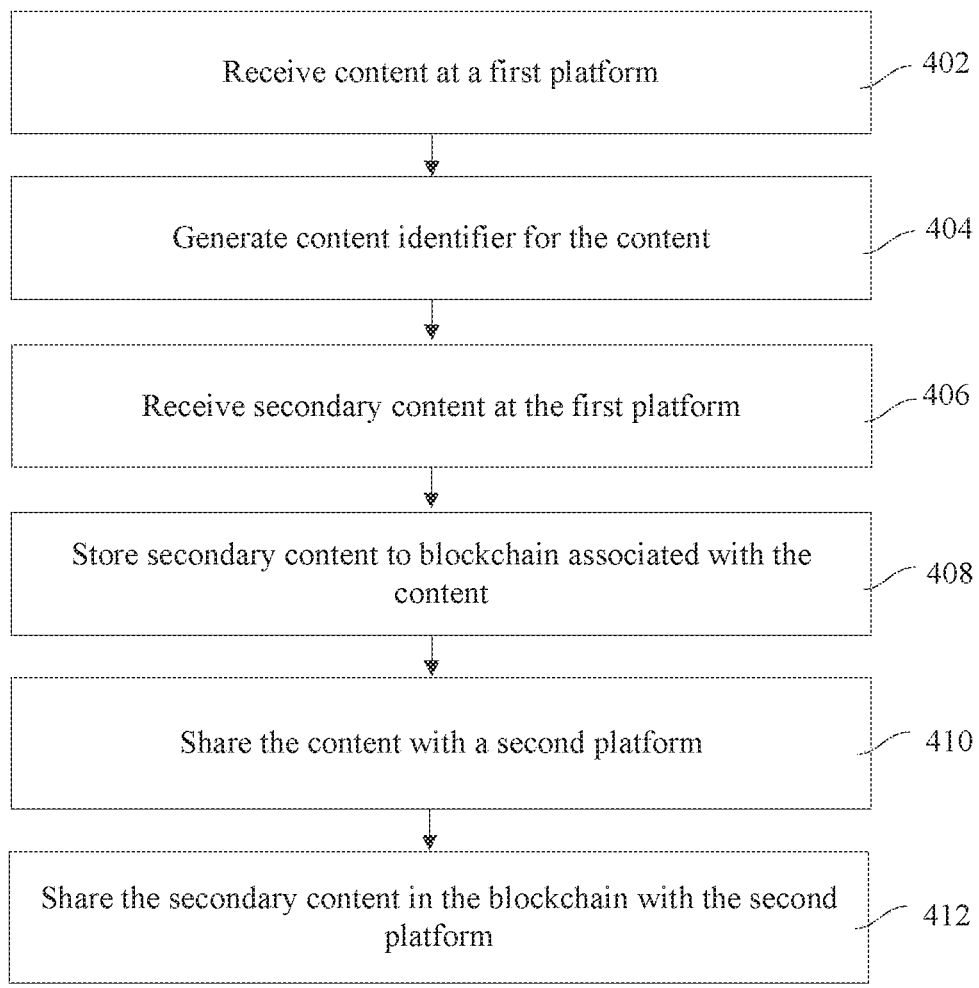
FIG. 4 is a flowchart of a method for sharing secondary content across multiple platforms, according to an embodiment.

FIG. 4 is a flowchart of a method 400 for sharing secondary content with multiple platforms, according to an embodiment. Method 400 may be performed using hardware and/or software components described in FIGS. 1-3. Note that one or more of the operations may be deleted, combined, or performed in a different order as appropriate.

At operation 402, content is received. For example, platform 104A receives content 110A from computing device 106.

At operation 404, a content identifier is generated. For example, ID generator 118 included in blockchain engine 116 may generate content identifier 120A for content 110A.

At operation 406, secondary content is received. For example, secondary content 112A-C, such as a "like", a comment, etc., of content 110 is received by platform 104A.

At operation 408, the secondary content is stored on blockchain. For example, platform 104A may cause blockchain engine 116 to store secondary content 112A-C for content 110 on blockchain 126A. In an embodiment, blockchain engine 116 may use content identifier 120A to access blockchain 126A that includes blocks that store secondary content 112 and may add secondary content 112A-C to blockchain 126A.

At operation 410, content is shared with another platform. For example, content 110A may be shared with platform 104B. This may occur when computing device 106D uploads content 110A and content identifier 120A from platform 104A to computing device 106D and then downloads content 110A and content identifier 120A to platform 104B.

At operation 412, the secondary content is shared with another platform. For example, platform 104B may use content identifier 120A to retrieve secondary content 112A-C for content 110A from blockchain 126A.

Figure 5:
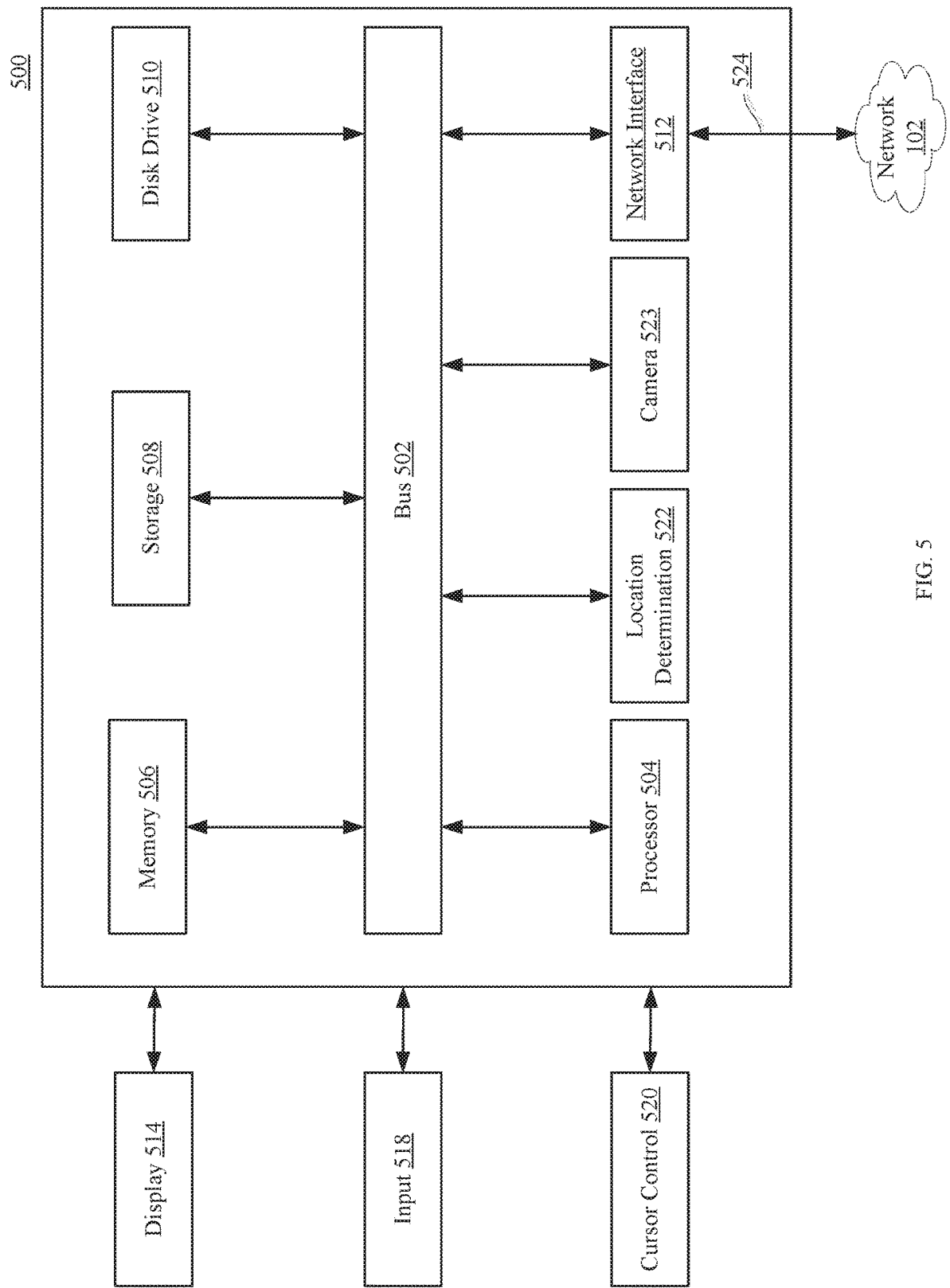
FIG. 5 is a block diagram of a computer system suitable for implementing one or more components or operations in FIGS. 1-4 according to an embodiment.

Referring now to FIG. 5 an embodiment of a computer system 500 suitable for implementing, the systems and methods described in FIGS. 1-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processing component 504 executing one or more sequences of instructions contained in the system memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processing component 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system for sharing secondary content among platforms, comprising:
   a non-transitory memory storing instructions; and
   one or more hardware processors coupled to the non-transitory memory and configured to read the instructions from the non-transitory memory to cause the system to perform operations comprising:
   receiving content from a first platform in a plurality of platforms, the first platform communicatively connected to the one or more processors by a network, wherein the content is available on the plurality of platforms;
   receiving a request to generate a content identifier for the received content from an application program interface (API) installed on the first platform;
   in response to the request to generate the content identifier, generating the content identifier for the content in a plurality of content;
   associating the content identifier with the content and with a blockchain in a plurality of blockchains, wherein each one of content identifiers is associated with a corresponding content in the plurality of content and a corresponding blockchain in the plurality of blockchains;
   receiving, via the network, a first set of secondary content from the first platform in the plurality of platforms, wherein the first set of the secondary content is associated with the content;
   receiving, via the network, a second set of the secondary content from a second platform in the plurality of platforms, wherein the second set of the secondary content is different from the first set of the secondary content;
   storing the first set of the secondary content and the second set of the secondary content in at least one block on the blockchain, the blockchain associated with the content identifier;
   receiving the content identifier for the content from a third platform in the plurality of platforms;
   selecting the blockchain from the plurality of blockchains using the content identifier; and
   providing the secondary content, including the first set of the secondary content and the second set of the secondary content from the selected blockchain to the third platform.

2. The system of claim 1, wherein the secondary content includes at least one comment associated with the content.

3. The system of claim 1, wherein the operations further comprise:
   storing the first set of the secondary content of the first platform on a first sidechain associated with at least one block on the blockchain; and
   storing the second set of the secondary content on a second sidechain associated with another block on the blockchain.

4. The system of claim 1, wherein the providing comprises:
   sharing the content and the content identifier with the third platform.

5. The system of claim 1, wherein the blockchain is associated with at least one sidechain that stores information associated with users that shared the content to the plurality of platforms.

6. The system of claim 1, wherein the operations further comprise:
   receiving a third set of the secondary content for the content from the second platform;
   storing, using the content identifier for the content, the third set of the secondary content received from the second platform in the blockchain;
   receiving the content identifier for the content from the third platform;
   selecting the blockchain from the plurality of blockchains using the content identifier; and
   sharing, using the blockchain, the third set of the secondary content with the third platform.

7. The system of claim 6, wherein the sharing the third set of the secondary content from the second platform with the third platform is in response to the blockchain storing the third set of the secondary content from the second platform.

8. A method comprising:
   receiving content at a first platform from a computing device;
   issuing a request to generate a content identifier for the received content from an application program interface (API) installed on the first platform;
   in response to the request to generate the content identifier, receiving, at the API, the content identifier generated for the content in a plurality of content;
   receiving secondary content from a plurality of computing devices, wherein the plurality of computing devices includes the computing device;
   associating the content identifier with the content in the plurality of content and with a blockchain in a plurality of blockchains, wherein each one of content identifiers is associated with a corresponding content in the plurality of content and a corresponding blockchain in the plurality of blockchains;
   transmitting the secondary content and the content identifier for storage in at least one block in the blockchain of the plurality of blockchains, wherein the blockchain stores the secondary content from the first platform and secondary content from a second platform;
   retrieving, using the API, secondary content from the second platform from the blockchain associated with the content identifier; and
   displaying, using the first platform, the secondary content from the first platform and the secondary content from the second platform.

9. The method of claim 8, wherein the secondary content includes at least one image associated with the content.

10. The method of claim 8, wherein the content identifier is associated with the content and with the blockchain.

11. The method of claim 8, wherein the blockchain is associated with a sidechain that stores comments that the plurality of computing devices received from a user in a plurality of users.

12. The method of claim 8, further comprising:
sharing the content and the content identifier for the content with a second computing device.

13. The method of claim 8, further comprising:
sharing the content and the content identifier for the content with the second platform.

14. A method for storing secondary content on a blockchain, the method comprising:
receiving, content from a first platform in a plurality of platforms over a network, wherein the content is available on the plurality of platforms;
receiving a request to generate a content identifier for the received content from an application program interface (API) installed on the first platform;
in response to the request to generate the content identifier, generating the content identifier associated with the content received from the first platform;
associating the content identifier with the blockchain in a plurality of blockchains, wherein each one of content identifiers is associated with a corresponding content in a plurality of content and a corresponding blockchain in the plurality of blockchains;
receiving, via the network, a first set of a secondary content from the first platform associated with the content;
receiving, via the network, a second set of the secondary content from a second platform in the plurality of platforms, wherein the second set of the secondary content is different from the first set of the secondary content; and
storing the first set of the secondary content and the second set of the secondary content in at least one block in the blockchain associated with the content identifier.

15. The method of claim 14, further comprising:
granting access to the first set and the second set of the secondary content associated with the content identifier to a third platform, wherein the granting access further comprises retrieving the first set and the second set of the secondary content from the blockchain with the content identifier.

16. The method of claim 15, further comprising:
receiving, via the network, the first set and the second set of the secondary content associated with the content identifier at the third platform.

17. The method of claim 14, wherein the storing further comprises:
storing the second set of the secondarycontent on a sidechain of a block in the blockchain associated with the second platform.

18. The method of claim 14, wherein a sidechain of the blockchain includes a type of content associated with the content and the content identifier.

19. The method of claim 18, wherein the type of content includes likes or dislikes of the content posted on the plurality of platforms.

20. The method of claim 14, wherein the first set of the secondary content associated with the content is received in response to the content displayed on the first platform.

21. A system for storing secondary content on a blockchain, the system comprising:
a non-transitory memory storing instructions; and
one or more hardware processors coupled to the non-transitory memory and configured to read the instructions from the non-transitory memory to cause the system to perform operations comprising:
receiving, content from a first platform in a plurality of platforms over a network, wherein the content is available on the plurality of platforms;
receiving a request to generate a content identifier for the received content from an application program interface (API) installed on the first platform;
in response to the request to generate the content identifier, generating the content identifier associated with the content received from the first platform;
associating the content identifier with the blockchain in a plurality of blockchains, wherein each one of content identifiers is associated with a corresponding content in a plurality of content and a corresponding blockchain in the plurality of blockchains;
receiving, via the network, a first set of a secondary content from the first platform associated with the content;
receiving, via the network, a second set of the secondary content from a second platform in the plurality of platforms, wherein the second set of the secondary content is different from the first set of the secondary content; and
storing the first set of the secondary content and the second set of the secondary content in at least one block in the blockchain associated with the content identifier.

22. The system of claim 21, further comprising:
granting access to the first set and the second set of the secondary content associated with the content identifier to a third platform, wherein the granting access further comprises retrieving the first set and the second set of the secondary content from the blockchain with the content identifier.

23. The system of claim 22, further comprising:
receiving, via the network, the first set and the second set of the secondary content associated with the content identifier at the third platform.

24. The system of claim 21, wherein the storing further comprises:
storing the second set of the secondary content on a sidechain of a block in the blockchain associated with the second platform.

25. The system of claim 21, wherein a sidechain of the blockchain includes a type of content associated with the content and the content identifier.

26. The system of claim 21, wherein the first set of the secondary content associated with the content is received in response to the content displayed on the first platform.

* * * * *